United States Patent [19]

Suzuki et al.

[11] Patent Number: 4,862,047
[45] Date of Patent: Aug. 29, 1989

[54] APPARATUS FOR GUIDING MOVEMENT OF AN UNMANNED MOVING BODY

[75] Inventors: Toru Suzuki, Hiratsuka; Atsuhiko Kato, Isehara; Mitsuo Hosoi; Ichiro Nakano, both of Hiratsuka, all of Japan

[73] Assignee: Kabushiki Kaisha Komatsu Seisakusho, Japan

[21] Appl. No.: 157,510

[22] PCT Filed: May 21, 1987

[86] PCT No.: PCT/JP87/00324
§ 371 Date: Jan. 20, 1988
§ 102(e) Date: Jan. 20, 1988

[87] PCT Pub. No.: WO87/07403
PCT Pub. Date: Dec. 3, 1987

[30] Foreign Application Priority Data

May 21, 1986 [JP] Japan .................. 61-116856
Jun. 27, 1986 [JP] Japan .................. 61-150902

[51] Int. Cl.⁴ ............................................. G05D 1/02
[52] U.S. Cl. ................................... 318/587; 318/580; 364/424.01
[58] Field of Search ............... 318/580, 587; 180/167, 180/168, 169; 364/424.01, 425, 450, 443, 444

[56]  References Cited

U.S. PATENT DOCUMENTS 4,566,032  1/1986  Hirooka et al. .

FOREIGN PATENT DOCUMENTS 182209  11/1982  Japan .
199007  12/1982  Japan .
204915  12/1982  Japan .
10831   1/1984  Japan .
62917   4/1984  Japan .
75315   4/1984  Japan .

Primary Examiner—Bentsu Ro
Attorney, Agent, or Firm—Welsh & Katz

[57]  ABSTRACT

This invention is intended to periodically correct the position and posture of an automatically steerable unmanned moving body according to a guiding method with the aid of dead reckoning or the like. A plurality of sets of at least two ground marks (8) are placed on the movement passage of the unmanned moving body (1) in a spaced relation along a reference passage (15) and the ground marks (8) are visually recognized by means of a television camera (6) or the like mounted on the unmanned moving body. Then, the existent position and posture of the unmanned moving body (1) are detected with reference to the results of visual recognition and thereafter the position and posture of the unmanned moving body (1) which have been calculated in accordance with the aforesaid guiding method or the like are corrected in accordance with the thus detected results.

7 Claims, 10 Drawing Sheets

4,862,047

APPARATUS FOR GUIDING MOVEMENT OF AN UNMANNED MOVING BODY

TECHNICAL FIELD

The present invention relates to an apparatus for guiding the movement of an unmanned moving body so as to guide the latter or correct its position using visual recognizing means.

BACKGROUND ART

Heretofore, as a method of bringing an unmanned vehicle to its destination along a predetermined movement passage, a guiding method with the aid of dead reckoning is known which is carried out by estimating the existent position of the vehicle with the aid of a moving direction detector and a movement length measuring instrument and then automatically steering the vehicle so as to pass through previously designated passing points on a predetermined passage. A drawback inherent to this method consists in that there occurs an error in respect of an estimated position of the vehicle due to ruggedness on the road surface or slippage of the vehicle, resulting in the vehicle failing to exactly pass through the predetermined passing points. Accordingly, in order to obviate the above-mentioned drawback, there have been already made various proposals as noted below as to a method of placing suitable ground marks on the movement passage in a spaced relation and intermittently correcting the estimated position of the vehicle by detecting the ground marks from the vehicle side.

(1) For instance, Japanese patent application No. 204915/1982 discloses a technical concept that a light reflector is disposed on the side surface of an object serving as a target, a light emitting element and a light receiving element constituting one pair are mounted on an unmanned vehicle and the latter is caused to turn about a fixed point located in the proximity of the aforesaid target until the vehicle assumes a posture at which the light receiving element receives the highest intensity of light from the light reflector whereby a posture of the vehicle is controlled properly.

(2) Further, Japanese patent application No. 199007/1982 proposes another technical concept that a plurality of environmental matters such as wood, building or the like are utilized as marks for measuring not only the position of an unmanned vehicle but also the position of a manned vehicle.

However, the method as disclosed in the above item (1) fails to detect the ground marks due to disturbance during movement of the unmanned moving vehicle because a sensor adapted to detect the ground marks has a narrow detection range. Also, the method as proposed in the item (2) has problems that means for discriminating the environmental matter such as wood, building or the like requires a remarkably high production cost and therefore the method can not be put in practical use at present.

The present invention has been made with the foregoing background in mind and its object resides in providing an apparatus for guiding the movement of an unmanned body which assures that the position of the unmanned moving body can be exactly corrected at a lower cost.

DISCLOSURE OF THE INVENTION

The present invention provides an apparatus for guiding the movement of an unmanned body, wherein a plurality of sets of at least two ground marks having a retroreflectivity or light emitting property are placed on the movement passage of the unmanned moving body along a reference passage and wherein the unmanned moving body includes visual recognizing means for momentarily calculating the existent position and posture of the unmanned moving body, for instance, in accordance with a guiding method with the aid of dead reckoning or the like and steering it under proper control with reference to the thus calculated values, memory means in which coordinate positions of the aforesaid ground marks are previously stored, detecting means for obtaining a declination angle and declination angle of the unmanned moving body relative to the aforesaid reference passage and a distance from a line segment which extends through the unmanned moving body to perpendicularly intersect the reference passage to the unmanned moving body with reference to at least the two ground marks which have been recognized by the aforesaid visual recognizing means and then detecting the existent position and posture of the unmanned moving body with reference to the thus obtained declination angle, displacement and distance as well as the content stored in the aforesaid memory means, and guiding position correcting means for properly correcting the position and posture of the unmanned moving body which have been calculated in accordance with the aforesaid guiding method or the like with reference to the thus detected position and posture whereby the position and posture of the unmanned moving body of which movement is guided in accordance with the aforesaid guiding method or the like are corrected intermittently.

Accordingly, the present invention assures that a plurality of ground marks can be reliably detected with the aid of the visual recognizing means having a wide visual field, the ground marks can be placed easily and moreover position correction can be highly exactly achieved at an inexpensive cost.

BEST MODE FOR CARRYING OUT THE INVENTION

Now, the present invention will be described in a greater hereunder with reference to the accompanying drawings which illustrate preferred embodiments thereof.

Figure 1:
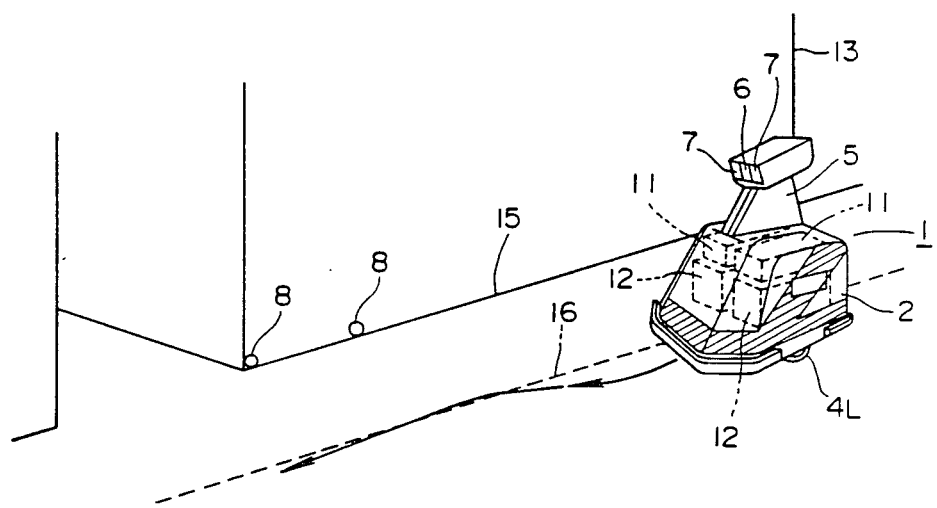
FIGS. 1, 2 and 3 a perspective view, a side view and a plan view of an unmanned moving mody of which movement is guided by means of an apparatus in accordance with an embodiment of the present invention.
Figure 2:
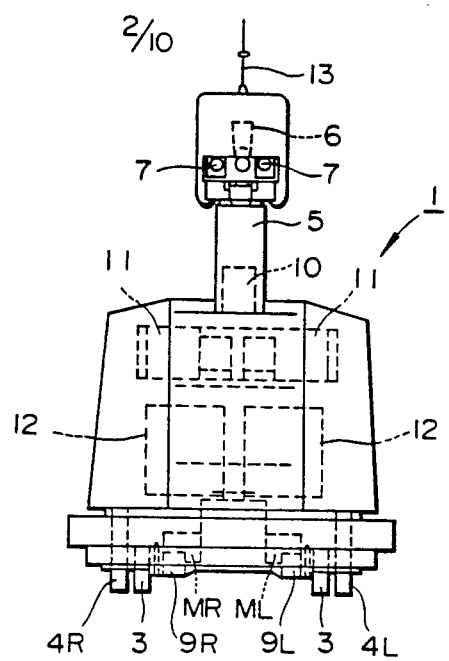
Figure 3:
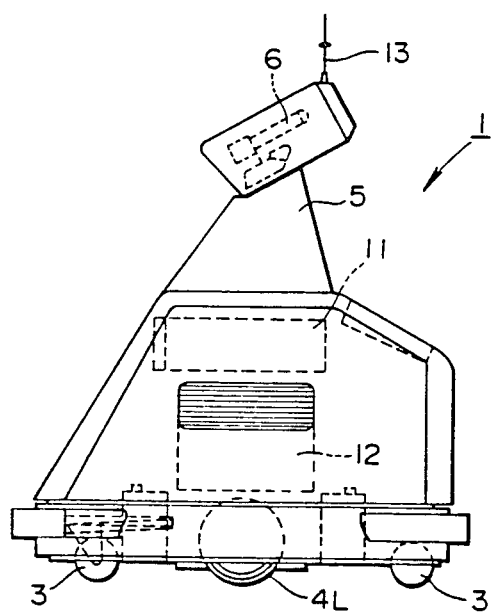

FIGS. 1, 2 and 3 are a perspective view, a front view and a side view each of which illustrates an unmanned moving body 1 of which movement is guided by means of an apparatus in accordance with an embodiment of the present invention.

As will be apparent from the drawings, the moving body 1 is provided with casters 3 on both the sides of the forward and rearward parts of a housing 2 and moreover it is provided with driving wheels 4R and 4L on both the sides of the central part of the housing 2. The driving wheels 4R and 4L are adapted to be rotated by means of motors $M_R$ and $M_L$ which are separately mounted in the interior of the housing 2. An ITV camera 6 serving as visual recognizing means is mounted on, a supporting stand 5 which is projected upwardly of the front part of the housing 2 and light emitters 7 are arranged on both the sides of the camera 6.

The camera 6 is mounted on the supporting stand 5 so as to have a certain angle of declination which is suitably determined in such a manner that a predetermined range of the road surface located forwardly of the housing 2 is included within the visual field of the camera 6, and the light emitters 7 are mounted so as to lighten the visual field of the camera 6. The motors MR and ML are equipped with pulse generators 9R and 9L such as pulse encoder or the like adapted to output pulse signals in response to rotation of the motors $M_R$ and $M_L$.

Further, the moving body 1 is provided with a direction detector 10 such as rate gyro or the like for detecting the direction of movement of the moving body 1, a CPU 11 for controlling the movement of the moving body 1 and processing images, a battery 12 and a sending and receiving antenna 13.

A plurality of ground marks 8 placed on the road surface are adapted to function as a sign for the purpose of guiding the movement of the moving body 1. In the illustrated embodiment, a glass ball having a retroreflectivity, that is, a nature of allowing light to be reflected in the same direction as that of incident light is employed for the ground marks 8. The ground marks 8 are placed in a spaced relation along a moving passage of the moving body 1 in such a manner as to constitute one set with two or more ground marks, and a line extending through a series of ground marks 8 functions as a reference line 15 for the moving body 1. It should be noted that a distance between the adjacent ground marks 8 is so determined that at least two ground marks 8 are included within the visual field of the camera 6.

Here, description will be made below as to a principle for calculating position of the moving body 1 relative to the ground mark 8 (identified by a combination of a displacement d, a declination $\sigma$ and a distance l) while seizing the ground mark 8 with the use of the camera 6.

Figure 4:
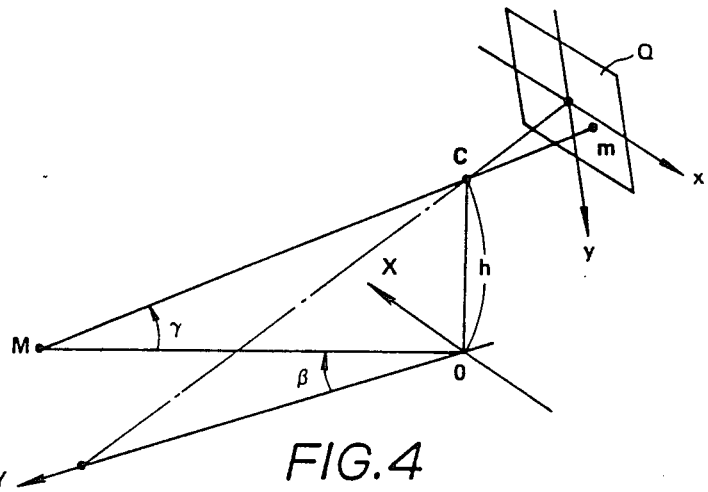
FIG. 4 is a view illustrating a geometrical relation between coordinates on a camera and coordinates on the ground surface.

When X and Y coordinates are established with respect to the ground surface and moreover x and y coordinates are established with respect to an image surface Q of the camera 6, as shown in FIG. 4, there is existent a geometrical relation between a coordinate point M on the ground surface and a coordinate point m on the image surface Q corresponding to the aforesaid coordinate point M. Accordingly, if the point coordinate m on the image surface Q is detected, the coordinate point M on the ground surface can be obtained and moreover an angle (depression angle) formed between a line segment $\overline{Mn}$ and the ground surface as well as an angle (azimuth angle) formed between a line segment $\overline{Mn}$ which appears by projecting the aforesaid line segment $\overline{Mn}$ onto the ground surface and the aforesaid Y-axis are obtained too.

Incidentally, in the drawing a point C is representative of a lens main point in the camera 6. The coordinates X and Y on the ground surface are established on the assumption that a point where a perpendicular extending through the point C intersects the ground surface is represented by a coordinate original point O, and the Y coordinate coincides with the direction of movement of the moving body 1.

Figure 5:
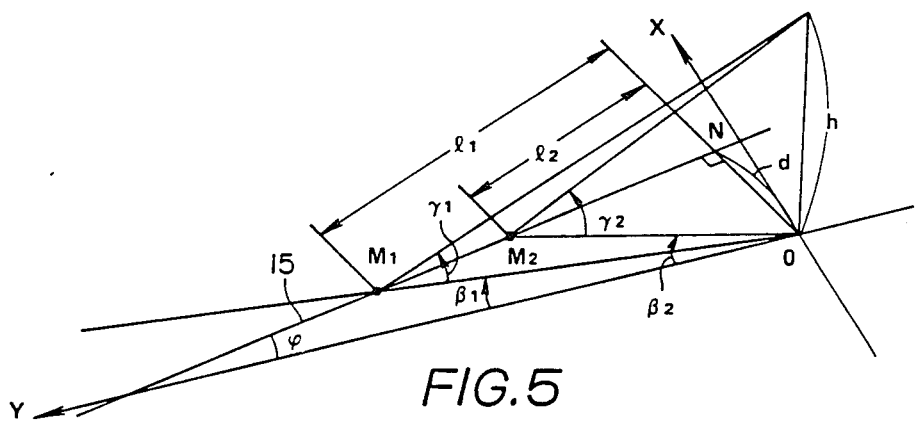
FIGS. 5 and 6 are an illustrative view for obtaining a displacement, declination angle and distance of the unmanned moving body relative to the ground mark, respectively.

Next, consideration is taken as to the case where coordinate points $M_1$ and $M_2$ on the ground surface are included within the visual field of the camera 6, as shown in FIG. 5.

A depression angle $\gamma_1$ and an azimuth angle $\beta_1$ with respect to the coordinate point $M_1$ as well as a depression angle $\gamma_2$ and an azimuth angle $\beta_2$ with respect to the coordinate point $M_2$ are obtainable from coordinate points $m_1$ and $m_2$ (not shown) on the image surface Q of the camera 6 corresponding to the aforesaid coordinate points $M_1$ and $M_2$ in the same manner as mentioned above. If the coordinate points $M_1$ and $M_2$ are obtained, an angle $\sigma$ formed between a line segment (reference passage) 15 extending through the coordinate points $M_1$ and $M_2$ and the Y-axis as well as a length d of the perpendicular extending from the original point O to the reference passage 15 can be calculated in accordance with the following formulas (1) and (2).

$$\phi = \tan^{-1}\left( \frac{\tan \gamma_2 \sin \beta_1 - \tan \gamma_1 \sin \beta_2}{\tan \gamma_1 \cos \beta_2 - \tan \gamma_2 \cos \beta_1} \right) \quad (1)$$

$$d = \frac{h \sin(\beta_1 + \phi)}{\tan \gamma_1} \quad (2)$$

where h is representaive of a distance between point C and point O.

Figure 6:
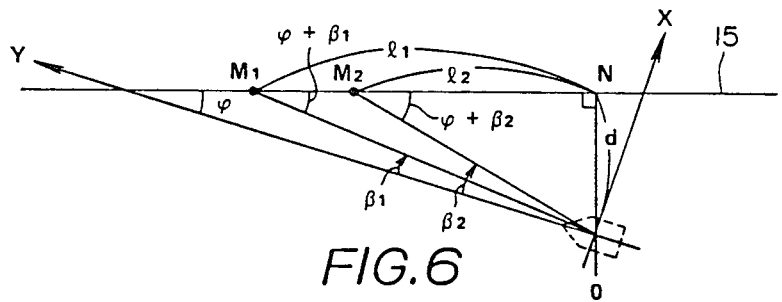

Further, a distance l between a foot point N of the perpendicular extending from point O and the coordinate point $M_1$ and a distance $l_2$ between the foot point N and the coordinate point $M_2$ on the reference passage 15 can be calculated in accordance with the following formulas (3) and (4) with reference to the geometrical relation as shown in FIG. 6.

$$l_1 = \frac{d}{\tan(\phi + \beta_1)} \quad (3)$$

$$l_2 = \frac{d}{\tan(\phi + \beta_2)} \quad (4)$$

When it is considered that the coordinate points $M_1$ and $M_2$ are representative of the position where the ground mark 8 is located, it follows that the angle $\sigma$ is representative of a declination angle of the moving body 1 relative to a line segment extending between the adjacent ground marks 8, the distance d is representative of a displacement (displacement in the transverse direction) of the moving body 1 relative to the aforesaid line segment and the distances $l_1$ and $l_2$ are representative of a distance of movement of the moving body 1 to the ground marks $M_1$ and $M_2$ along the reference passage 15, respectively.

The above description is intended to explain a principle for detecting a position of the moving mody 1 relative to the ground mark 8 and a posture angle of the moving body 1 relative to the reference passage 15. In the following embodiments, this principle is applied to correction of the position and the posture of the moving body when movement of the moving body is guided along a predetermined movement passage in accordance with a speculation navigation method. Now, description will be made below as to an embodiment of the present invention with reference to FIG. 7 which is a block diagram illustrating how to control the movement of the moving body.

Figure 7:
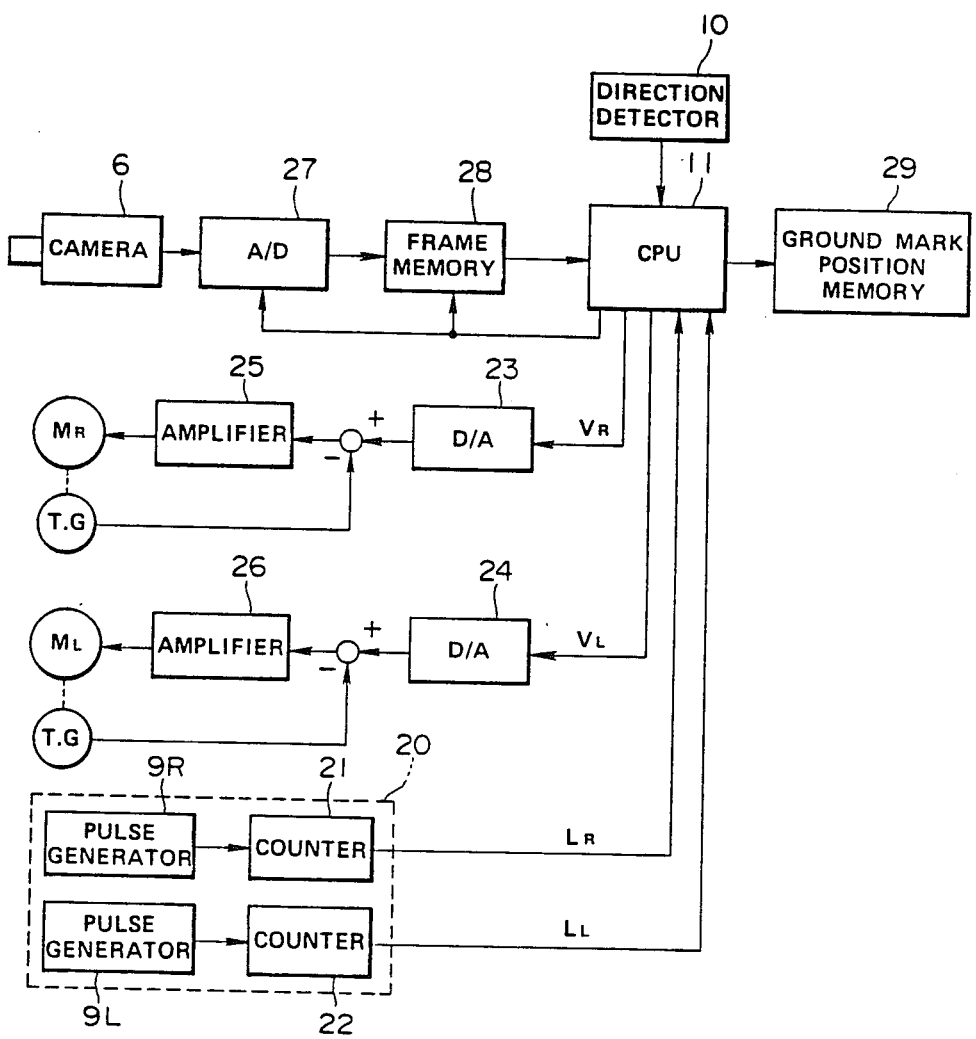
FIG. 7 is a block diagram illustrating an example of for controlling the apparatus in accordance with the embodiment of the present invention.

Refering to FIG. 7, a movement distance detector 20 detects movement distances $L_R$ and $L_L$ of the moving body 1 by counting the numnber of pulses transmitted from the pulse generators 9R and 9L fitted to the driving wheels 4R and 4L with the use of counters 21 and 22 and the thus detected movement distance $L_R$ and $L_L$ are inputted into the CPU 11. In this case, the CPU 11 uses an average value of values counted by both the counters 21 and 22 as distance data in order to obtain a movement distance of the central position of the moving body 1. The direction detector 10 is a rate gyro which obtains the direction of movement of the moving body 1, for instance, by detecting an extent of variation in direction of the movement and then integrating the results of detection, and the thus detected direction of movement of the moving body is inputted into the CPU 11. The CPU 11 speculates an existent coordinate position of the moving body 1 with reference to date concerning movement distance and data concerning direction of the movement both of which are inputted thereinto from the movement distance detector 20 and the direction detector 10 and then detects an extent of displacement away from the predetermined movement passage 16 (see FIG. 1) and a posture angle of the moving body 1 whereby movement of the moving body 1 is so controlled that the moving body 1 moves along the predetermined movement passage 16.

Figure 8:
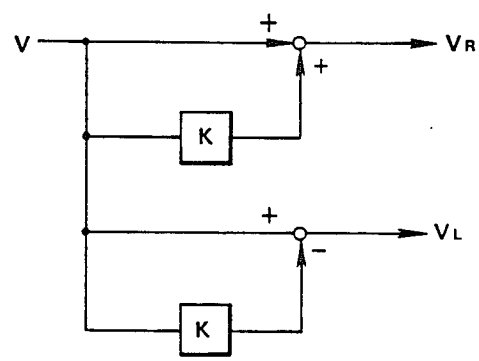
FIG. 8 is a graph illustrating a mamner of variation of a value K.

As shown in FIG. 8, the CPU 11 includes a program for producing a speed command $V_R$ by adding a value K to a moving speed command V for the moving body 1 and producing a speed command $V_L$ by subtracting a value K from the aforesaid moving speed command V, and the thus produced commands $V_R$ and $V_L$ are added to servo amplifiers 25 and 26 via D/A converters 23 and 24.

Figure 9:
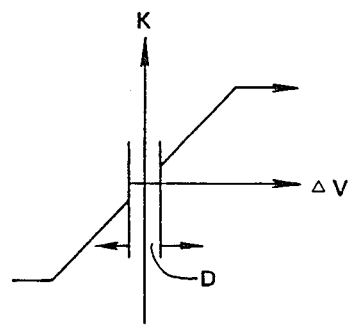
FIG. 9 is a view exemplifying a system for producing a speed command signal.

The aforesaid value K varies with respect to $\Delta V = (dr - d) + C(\sigma r - \sigma)$ (C;constant) in such a fashion as shown in FIG. 9. Accordingly, in the case where both difference between a predetermined displacement dr and an actual displacement d and difference between a target declination angle $\sigma r$ and an actual declination angle $\sigma$ are small and $\Delta V$ has a value within an insensible zone D as shown in FIG. 9, the result is that $K = O$ is established and thereby speed commands as represented by $V_R = V$ and $V_L = V$ are produced whereby the driving wheels 4R and 4L are rotated at the same rotational speed and thereby the moving body 1 is caused to move linearly.

Further, in the case where $\Delta V$ assumes a positive value more than the value within the insensible zone D, the result is that $V_R > V_L$ is established. Thus, the right-hand driving wheel 4R is rotated at a rotational speed higher than that of the left-hand driving wheel 4L and thereby the moving body 1 is steered to move in the leftward direction. On the contrary, in the case where $\Delta V$ assumes a negative value more than the value within the insensible zone D, the result is that $V_R < V_L$ is established. Thus, the moving body 1 is steered to move in the right-hand direction. It should be noted that a steering angle increases as an absolute value of $\Delta V$ increases.

On the other hand, a video signal outputted from the camera 6 is binary-coded in an A/D converter 27 and thereafter it is writen into a frame memory 28. At every time when one figure section is produced, the content stored in the frame memory 28 is introduced into the CPU 11. Accordingly, when the moving body 1 approaches in the proximity of the ground mark 8 as it moves, the ground mark 8 is seized as a bright point-shaped figure image by means of the camera 6 due to the fact that the ground mark 8 is formed by a glass ball having a retro-reflectivity. Then, the CPU 11 recognizes a plurality of ground marks 8 (for instance, 2 to 3 ground marks) existent within the visual field of the camera 6 with reference to data concerning the bright point-shaped figure image stored in the frame memory 28 and selects two ground marks 8 among the plurality of ground marks, for instance, two ground marks from those located in the proximity of the moving body. Then, the CPU 11 obtains coordinate points $M_1$ and $M_2$ on the ground surface with respect to two ground marks, calculates a declination angle $\gamma_1$ and an azimuth angle $\beta_1$ with respect to coordinate point $M_1$ as well as a declination angle $\gamma_2$ and an azimuth angle $\beta_2$ with respect to the coordinate point $M_2$ and then executes operations as shown in the formulas (1), (2), (3) and (4) to obtain a declination angle $\sigma$, a displacement d and distance $l_1$ and $l_2$ of the moving body 1.

Positional coordinates of each of the ground marks 8 are previously stored in a ground mark position memeory 29 as in shown 7, and the CPU 11 obtains the existent coordinate position and posture of the moving body 1 with reference to the declination angle $\sigma$, the displacement d and the distances $l_1$ and $l_2$ of the movement body 1 obtained in the above-described manner and the coordinate position of the ground mark 8 read out from the coordinate position memory 29. Then, the thus obtained data are compared with the speculated coordinate position and posture obtained in response to detection output of the movement length detector 20 and the direction detector 10, and the speculated position and posture are corrected by driving the motors $M_R$ and $M_L$ under proper control with reference to the results of the aforesaid comparison. Thereafter, steering and controlling of the moving body 1 are achieved in accordance with the speculation navigation method while the corrected position and posture of the moving body 1 are maintained as initial state.

Thus, according to the above-described embodiment of the present invention, any ground mark not only can be reliably detected with the use of visual recognizing means having a wide visual field but also placement of the ground mark can be easily carried out. Accordingly, the position of the moving body can be corrected advantageously in terms of cost and at a high accuracy.

Incidentally, in the above-described embodiment, glass balls having a returnable reflectivity are used as a ground mark 8. However, the present invention should not be limited only to this. Alternatively, corner cube prisum, adhesive tape having a returnable reflectivity in a predetermined form, light reflector usable for guide rail or the like may be employed in place of the glass ball. In the case where these ground marks are in use, they can be easily discriminated from other object appearing on a figure image when they have a predetermined shape.

Further, it is possible to use a light emitting body such as LED, electric-light bulb, flurorescent lamp or the like as a ground mark 8, and in this case, the light emiiters 7 employed for the illustrated embodiment are not required. Incidentally, when light emitters adapted to emit light having a specific wave length are used, disturbance can be removed by providing on the the visual recognizing side a filter through which light having the aforesaid specific wave length can pass. Similarly, disturbance can be removed by intermittently turning on the light emitter at a predetermined frequency by performing image processing with the use of frequency of the aforesaid intermittent turning-on on the visual recognizing side.

After all, a variety of ground marks can be selectively used as a ground mark 8, as far as visual recognizing means can distingish the ground mark 7 from other object. Accordingly, it suffices that ground marks most suitable for the moving atmosphere in which the moving body 1 moves are selected and used.

Further, in the above-described embodiment the television camera 6 is used as visual recognizing means, but in the case where light emitters are employed for the ground marks 8, a two-dimensional semiconductor position detector (position sensor) can also be used as visual recognizing means.

In the illustrated embodiment, steering and controlling of the moving body 1 are achieved in accordance with the speculation navigation method. Further, according to the arrangement made in the above-described manner, it is possible to enable the moving body 1 to move along various passeges by using as a reference the ground marks having a
retro-reflectivity disposed intermittently along a predetermined reference passage for the purpose of guiding the movement of the moving body 1.

Figure 10:
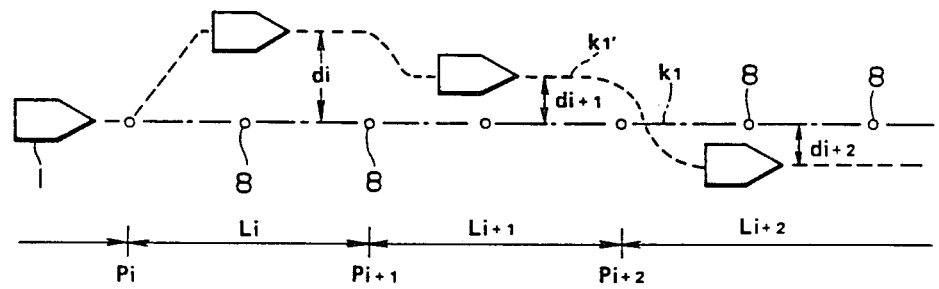
FIG. 10 is a view exemplifying a manner of guiding the movement of the unmanned moving body relative to a reference passage in accordance with other guiding system.

Namely, a reference passage $K_1$ is constituted by a plurality of ground marks 8 as shown in FIG. 10. As is apparent from the drawing, the ground marks 8 are disposed intermittently along a movement passage of the moving body 1 and a line extending through the ground marks 8 functions as a reference passage $k_1$ relative to the moving body 1, as will be described later.

A distance between the adjacent ground marks 8 is so determined that at least two ground marks are always included within the visual field of the camera 6. Namely, if a target displacement dr (or target distance dr and target declination angle $\sigma r$) is preset with respect to each of sections Li, Li+1,—on the passage the moving body 1 is so steered that an actual displacement dr (or actual displacement dr and actual declinatiuon angle $\sigma r$) of the moving body 1 with respect to each of the aforesaid sections coincides with a predetermined displacement dr (or predetermined displacement dr and predetermined declination angle $\sigma r$) with respect to the aforesaid section, movement of the moving body 1 along various passages having a reference passage $k_l$ as a reference, for instance, a passage $k_1'$ as shown in the drawing can be guided.

Figure 11:
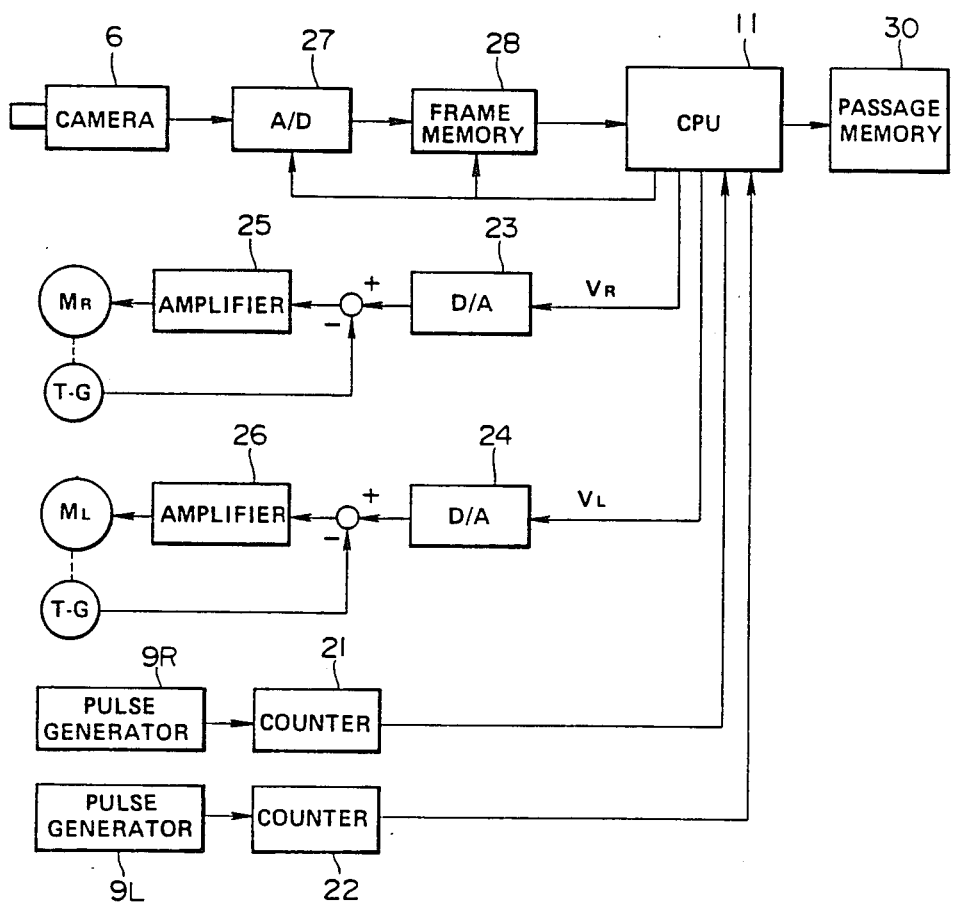
FIG. 11 is a block diagram illustrating an example of arrangement for controlling the movement of the unmanned moving body in the case where the guiding system as shown in FIG. 10 is employed.

FIG. 11 is a block diagram illustrating an embodiment for controlling the movement of the moving body under proper guiding in the above described manner, and a target displacement dr and a target declination angle $\sigma$ r to be assumed by the moving body 1 at each of positions are previously stored in a passage memory 30. For instance, in the case where a reference passage $K_1$ is constructed as shown in FIG. 10 by a series of ground marks 8, a plurality of target displacements dr (di, di+1,—) and a plurality of target declination angles $\sigma r$ are stored with respect to positions Pi, Pi+i,—.

Since each of the ground targets 8 is constituted by a glass ball having a retro-reflectivity, as mentioned above, it is seized as a bright point-shaped figure image by means of the camera 6. Then, the CPU 11 visually recognizes a plurality of ground marks 8 (for instance, 2 to 3 ground marks) existent within the visual field of the camera 6 with reference to the data concerning the bright point-shaped figure image stored in frame memory 28 and then selects two ground marks, for instance, adjacent two ground marks among these ground marks. Thereafter, coordinate points $M_1$ and $M_2$ on the ground surface shown in FIG. 5 are obtained with respect to the two ground marks as mentioned above, a declination angle $\gamma_1$ and an azimuth angle $\beta_1$ with respect to the coordinate point $M_1$ as well as a declination angle $l_2$ and an azimuth angle $\beta_2$ are calculated and then operations as shown in the above-noted equations (1), (2), (3) and (4) are executed whereby a declination angle $\sigma$ and a displacement d of the moving mody 1 are obtained.

The CPU 11 detects the position Pi, Pi+i,—by counting from output of the camera 6 the number of ground marks 8 which pass through each of above positions and then successively read from the memory 15 the target displacement dr and the target declination angle $\sigma r$ with respect to each of the positions. Then, speed commands $V_R$ and $V_L$ to be issued to the motors MR and ML are produced and outputted with reference to the read displacement dr and declination angle $\sigma$ as well as the detected actual displacement d and the actual declination angle $\sigma$ of the moving body 1 in the the above-described manner.

When the guiding method as mentioned above is employed, in the case where the target displacements dr with respect to the positions Pi, Pi+1, Pi+2,—as shown in FIG. 10 are set in such a manner that di; (>O), di+1 (>O), di+2 (>O) and each of the target declimination angles $\sigma r$ is set to $\sigma r=0$, movement of the moving body 1 is so guided that a displacement of the moving body 1 amounts to di and a declination angle of the moving body 1 amounts to zero, for instance, within the section Li. Also in other sections, movement of the moving angle 1 is guided in the same manner. Accordingly, in the illustrated example a passage $K_1'$ shown by dotted lines in the drawing becomes a movement passage of the moving body 1.

Figure 12:
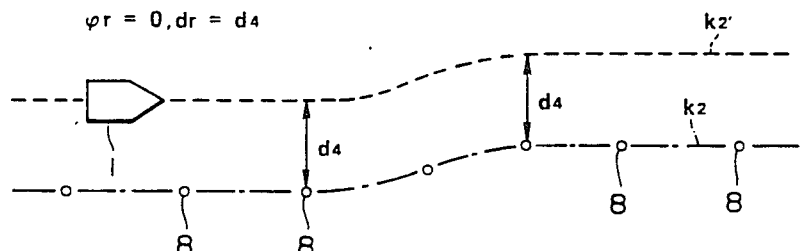
FIGS. 12 and 13 are a view exemplifying a manner of determining another reference passage in accordance with the guiding system as shown in FIG. 10, respectively.
Figure 13:
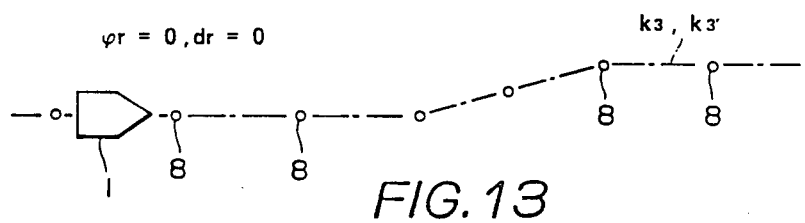

Incidentally, when this guiding method is employed, it is possible to guide the movement of the moving body 1 along a passage $K_2$, shifted from the reference passage $K_2$ by a distance of $d_4$, as shown in FIG. 12. Further, it is naturally possible to guide the movement of the moving body along a passage $K_3$ identical to the reference passage $K_3$ as shown in FIG. 13.

As is apparent from the above description, this embodiment offers an advantageous effect that movement of the moving body can be guided along various passages different from a reference passage by changing a target displacement or both a target displacement and a target declination angle with respect to each of the positions on the reference passage which is produced by a series of ground marks.

In the above-described embodiment, a predetermined declination angle $\sigma_T$ is fixedly set to $\sigma_T$ 0. Alternatively, a proper amount of declination angle $\sigma_T$ is set at each of the movement position in dependence on a shape of the passage along which movement of the moving body should be guided.

Further, in the above-described embodiment, both the target displacement and target declination angle are specified. Alternatively, only the displacement dr may be specified. That is to say, it is also possible to obtain a value of the aforesaid K by allowing the CPU 11 to process $\Delta V = (dr - d)$ and guide the movement of the moving body 1 with the use of the thus obtained value of K. It should be noted that when both the displacement dr and the declination angle $\sigma_T$ are specified, changing of the passage of the moving body can be achieved at a higher accuracy.

Furthermore, in the above-described embodiment, the positions Pi, Pi+i,—where the passage of movement of the moving body 1 varies are detected from the number of ground marks 8 which passes through each of the aforesaid positions. Alternatively, it is also possible that the ground marks relative to these positions are designed in a special form and their pattern is visually recognized in order that each of the positions is detected. Further, it is also possible to give information indicative of each of the positions from a sign post or the like means which is disposed sidewardly of the passage.

Incidentally, in the case where changing of the passage is effected at the position where the moving body 1 moves from, for instance, the position Pi by a predetermined distance, the position where changing of the passage is achieved can be detected by counting the number of pulses outputted from the pulse generators 9R and 9L as shown in FIG. 1 with the use of pulse counters after the moving body 1 reached the position Pi. In this case, the CPU 11 uses an average value of the counted values of both the counters as distance data in order to obtain a movement distance of the central position of the moving body 1.

Next, description will be made below as to the case where the present invention is applied to an inspecting apparatus for inspecting a dust proofing property of a dust-proof filter arranged in a clean room.

A factory in which precision parts are produced for semiconductor device or the like includes a number of filters on the ceiling side thereof in order to inhibit dust or the like fine granular foreign material from entering these precision parts to degrade their properties. Thus, clean air is always blown through the filters into the interior of a clean room whereby the precision parts are produced in the clean room.

However, since the dust proofing property is decreased remarkably when small holes such as pin hole or the like are produced on the filters, a degree of cleanliness in the interior of the whole clean room can not be maintained.

Heretofore, an operator brings a granular material measuring instrument in a clean room when the latter is built or at a time of periodical inspection of the clean room in order to inspect the number of granular materials included in an air which is blown into the interior of the clean room through the filters. However in the case where the clean room is inspected by an operator, some amount of dust is generate by him, resulting in a failure to obtain accurate inspection results. Another problem is that inspection performed by an operator takes a longer period of time and it is very difficult to hold a probe of the granular material measuring instrument while maintaining the same posture.

In view of the problems as mentioned above, this embodiment is intended to automatically inspect the dust proofing property of the filter at a high accuracy for a short period of time in accordance with the above-described method of guiding the movement of a moving body.

Figure 14:
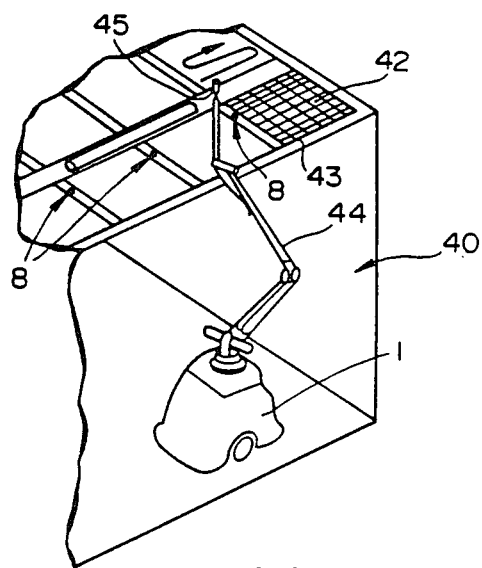
FIG. 14 is a perspective view illustrating an apparatus for guiding the movement of an unmanned moving vehicle in accordance with other embodiment of the present invention in the case where the present invention is applied to inspection of dust-proof filters in a clean room.

FIG. 14 is a perspective view of a clean room and an unmanned moving vehicle to which the embodiment of the invention is applied. As is apparent from the drawing, the clean room 40 is provided with a number of dust-proof filters 42 having a required contour on the ceiling (or the floor) thereof and each of the filters 42 is snugly fitted in a fitting frame 43. Further, the fitting frame 43 has a plurality of ceiling marks 8 for each of filters for the purpose of guiding the movement of an unmanned vehicle 1. Each of the ceiling marks 8 is made of returnable reflective material having high reflectivity.

Figure 15A:
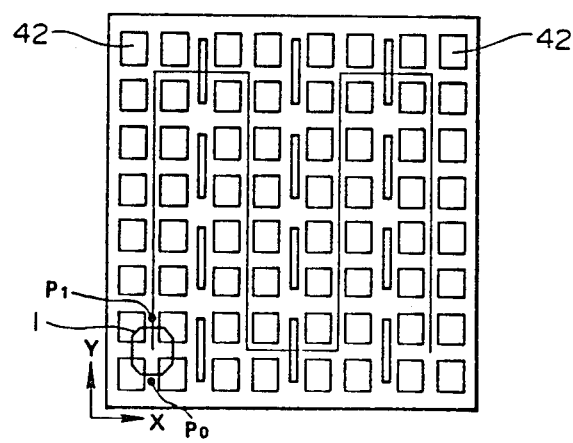
FIGS. 15(a)–(c) are plan views of the ceiling of the clean room, particularly illustrating movement passages of the unmanned moving vehicle.
Figure 15:
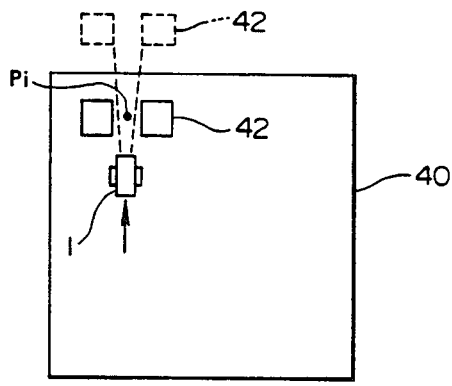
Figure 15:
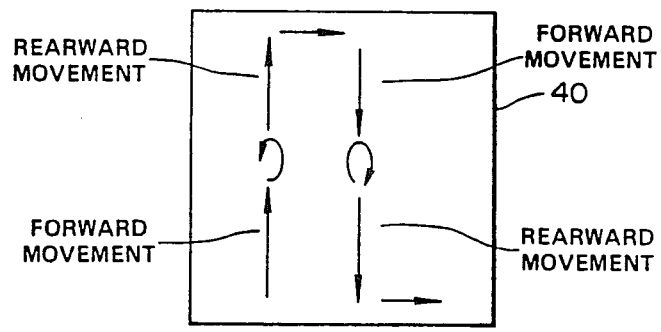

FIG. 15(a) is a plan view of the ceiling of the clean room as seen from the below. The unmanned vehicle 1 moves forwardly along a passage between two rows of dust-proof filters 42 as represented by an arrow mark and temporarily stops at a measuring reference position p0 as shown by the mark 8 in order to measure the number of granular materials blown through the two dust-proof filters 42 located on both the sides of the position P0 by scanning operation with the use of a probe 45 which is attached to the top of an arm of a manipulator 44. On completion of the measurement, it moves forwardly further to a next measurement reference position P1 to carry out the same measuring operation. Such a measuring operation as mentioned above is performed for all the filters by allowing the unmanned vehicle to move along the passage as represented by arrow marks.

During measuring operation the mark 8 is detected by means of a camera which is mounted on the side of the unmanned moving vehicle 1. However, when the unmanned moving vehicle 1 reaches the measuring reference position Pi located closest to the wall surface of the clean room as seen in the direction of forward movement thereof, as shown in FIG. 15(b), there is not existent any mark in an area located forwardly of the unmanned vehicle 1 and therefore the latter can not make any decision as to its movement passage along which it moves. In view of this problem, an arrangement is made such that when it moves by a distance equal to substantially half of the width of the clean room, movement of the unmanned vehicle 1 is shifted to rearward movement to enter the next row of passage and when it moves to the position in the proximity of the wall surface of the clean room, movement of it is shifted to forward movement whereby all the filters 42 can be inspected by repeating the above-mentioned zigzag movements.

Figure 16:
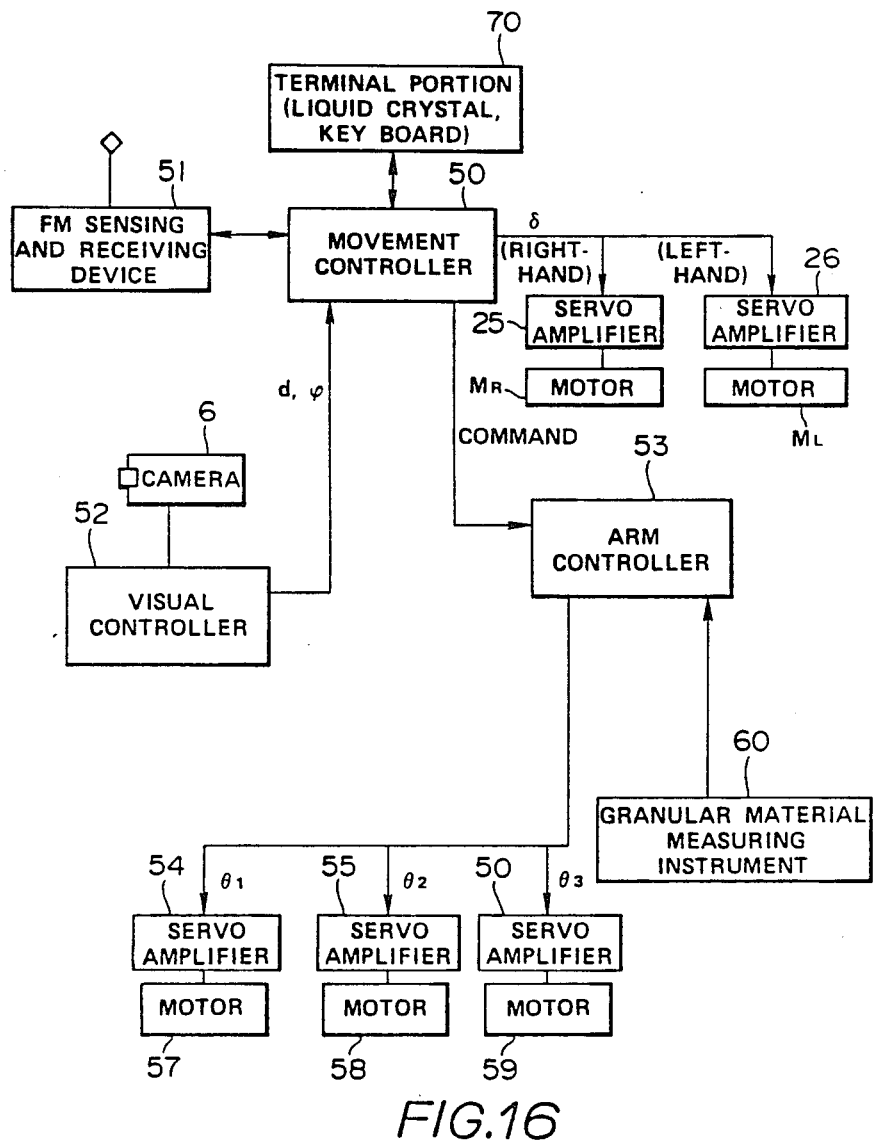
FIG. 16 is a block diagram illustrating arrangement of various instruments mounted on the unmanned moving vehicle as shown in FIG. 14.

FIG. 16 is a block diagram illustrating arrangement of various kinds of instruments and devices mounted on the unmanned moving vehicle 1. When a movement controller 50 receives an inspection start command via a FM sending and receiving device 51, a rotation command for rotating both the left-hand and right-hand wheels of the unmanned moving vehicle 1 is outputted and it is inputted into the motors MR and ML mounted on the wheel shaft via servo amplifiers 25 and 26. This causes the left-hand and right-hand wheels to start their rotation and thereby the moving vehicle starts its movement. On the other hand, a visual controller 52 detects presence of a mark 8 by an image signal inputted from the photographying camera 6 to represent an area located forwardly of movement of the moving vehicle and moreover it discriminates in accordance with the above-described method as to how much displacement (d) in the transverse direction and declination angle ($\sigma$) the moving vehicle 1 has relative to the predetermined movement passage. The results of discrimination are transferred to the movement controller 50. Thus, the movement controller 50 controls a steering angle $\delta$ with reference to the thus detected transverse displacement (d) and declination angle ($\sigma$) so as to allow $d = \sigma = 0$ to be established. The steering angle is controlled by varying the number of rotations of both the left-hand and right-hand wheels in accordance with the aforesaid speed commands VR and VL.

When the unmanned vehicle 1 reaches NO. n measuring reference position Pn (n = 1, 2 —) after starting of movement thereof along a predetermined movement passage, the movement controller 50 causes rotation of the wheels to be stopped temporally so as to issue a measuring start command to an arm controller 53 in order to start inspection of a dust profooing property of the dust proof-filters 42 at the existent poosition. Then, the arm controller 53 transmits signals for controlling a turning angle $\theta 1$ of a base for the manipulator 44, an inclination angle $\theta 2$ of the first arm and an inclination angle $\theta 3$ of the second arm to motors 57, 58 and 59 via servo amplifiers 54, 55 and 56, controls the angles of $\theta 1$, $\theta 2$ and $\theta 3$ in accordance with an amount of rotations of the motors 57, 58 and 59 and then allows the probe 45 on the top of the second arm to scan along the surface of each of the filters 42 that are an object to be measured. This causes the number of granular materials included in an air blown into the probe to be measured by means of a granular material measuring instrument 60. The value of measurement is transferred to a terminal 70 comprising a liquid crystal display device, a key board ad an auxiliary storage device whereby the number of the thus measured filter and informations concerning the the position where the filter is fitted are stored in the terminal 70 in an addition form.

Thus, a dust proofing property of all the dust-proof filters 42 is inspected by performing the above-mentioned operations at each of the measuring reference points.

In order to control a distance of movement of the unmanned moving vehicle 1 and scanning operations of the probe 45 by means of the manipulator 44, data comprising a height of the ceiling, dimensions of the filter (as seen in the X and Y directions) and the number of fitting frames and a width of the fitting frame (as measured in the x and y directions) are fed from the key board in the terminal section 70 to the movement controller 50, the visual controller 52 and the arm controller 53. Further, data such as scanning speed of the probe 45, measuring time of the granular material measuring instruments 60 at each of the measurement positions or the like data are fed from the key board to the arm controller 53 and the granular material measuring instrument 60.

Here, the reason why the number of fitting frames is inputted consists in that numerals of the numbers $f_x$ and $f_y$ of fitting frames as counted in the x and y directions plus 1 are identical to the numbers of filters as counted in the x and y directions.

When necessary data as mentioned above are inputted into the moving controller 50, the latter automatically determines a movement sequence and a movement passage and on receipt of an inspection start signal, the unmanned moving vehicle starts its movement. Further, the moving controller 50 determines in dependence on a value of $f_x$ whether the unmanned moving vehicle moves while inspecting the filters 2 on both the sides of the movement passage or it moves while inspecting the dust-proofing filters 2 on one side of the movement passage. Thus, an algorithm for determining a movement passage is determined so as to inspect all the filters at a high efficiency.

Incidentally, a measured value relative to the number of granular materials stored in the auxiliary storage device of the terminal section 30 is displayed on a liquid crystal display device located outside the clean room after completion of the inspection operations or is printed by a printing device so as to confirm which filter has a degraded property. Further, it is possible to transmit data to a monitor device located outside the clean room during inspecting operation.

It should of cousce be understood that not only the whole clean room but also only a specific area in the clean room can be inspected.

According to this embodiment, a property of each of dust proof-filters can be automatically inspected by means of the granular material measuring instrument mounted on the unmanned moving vehicle in the above-described manner. Thus, a property of each of filters can be inspected at a high accuracy without any adverse effect caused by dust from an operator or the like. Further, since a movement passage for the purpose of inspection is automatically selectively determined in dependence on arrangement of the filters, inspection can be finished at a high efficiency within a short period of time.

The present invention is advantageously useful for an apparatus for intermittently correcting the position and the posture of an unmanned moving body for which an automatic steering system such as speculation navigation method or the like is employed. Besides, it is applicable to an unmannned moving body or the like for inspecting a dust proofing property of each of filters in a clean room or the like place.

We claim:

1. An apparatus for guiding the movement of an unmanned moving body, wherein plural sets of at least two ground marks are placed on a movement passage of said unmanned moving body in a spaced relation along a reference passage, and wherein said unmanned moving body includes;

first detecting means for detecting the existent position and posture of the unmanned moving body, visual recognizing means for visually recognizing presence of each of said ground marks, memory means for storing coordinate positions of each of the ground marks, second detecting means for obtaining a declination angle and a displacement of the unmanned moving body relative to said reference passage and a distance from a line segment which extends through the moving body to perpendicularly intersect the reference passage to the moving body with reference to at least the two ground marks which are recognized by said visual recognizing means, and detecting the existent position and posture of the unmanned moving body with reference to the thus obtained declination angle, displacement and distance as well as the content stored in said memory means, and guiding position correcting means for correcting the position and posture detected by said first detecting means with reference to the position and posture detected by said second detecting means, when detecting output from the second detecting means is obtained.

2. An apparatus for guiding the movement of an unmanned moving body as claimed in claim 1, wherein each of the ground marks is a ground mark having a returnable reflectivity and the unmanned moving body further comprises light emitting means for lightening a visual field of said visual recognizing means.

3. An apparatus for guiding the movement of an unmanned moving body as claimed in claim 1, wherein each of the ground marks has a luminous property.

4. An apparatus for guiding the movement of an unmanned moving body as claimed in claim 1, wherein the visual recognizing means is mounted on the unmanned moving body while maintaining a properly determined depression angle.

5. An apparatus for guiding the movement of an unmanned moving body as claimed in claim 1, wherein the visual recognizing means comprises a television camera.

6. An apparatus for guiding the movement of an unmanned moving body as claimed in claim 1, wherein the visual recognizing means comprises a two-dimensional semiconductor position detector.

7. An apparatus for guiding the movement of an unmanned moving body as claimed in claim 1, wherein the first detecting means includes movement length detecting means for detecting a movement length of the unmanned moving body and movement direction detecting means for detecting the direction of movement of the unmanned moving body whereby the existent position of the unmanned moving body is calculated with reference to detection output from said first detecting means in accordance with a speculation navigation method.

* * * * *